US008566715B2

(12) United States Patent
Hattori et al.

(10) Patent No.: US 8,566,715 B2
(45) Date of Patent: Oct. 22, 2013

(54) DEVICE, METHOD AND COMPUTER READABLE MEDIUM FOR PROCESSING COMMANDS IN DATA DESCRIBED USING A PAGE DESCRIPTION LANGUAGE

(75) Inventors: Hiroshi Hattori, Gifu (JP); Norio Mizutani, Mie (JP); Kunihiko Sakurai, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 669 days.

(21) Appl. No.: 12/388,812

(22) Filed: Feb. 19, 2009

(65) Prior Publication Data
US 2009/0210785 A1  Aug. 20, 2009

(30) Foreign Application Priority Data

Feb. 19, 2008 (JP) ................................ 2008-037130
Mar. 31, 2008 (JP) ................................ 2008-089613

(51) Int. Cl.
*G06F 17/00* (2006.01)
*G06F 3/12* (2006.01)

(52) U.S. Cl.
USPC ............ 715/276; 715/250; 715/273; 358/1.1

(58) Field of Classification Search
USPC .......................... 715/250, 251, 252, 273, 276
See application file for complete search history.

(56) References Cited

U.S. PATENT DOCUMENTS

| 5,303,336 | A |   | 4/1994 | Kageyama et al. |         |
|-----------|---|---|--------|-----------------|---------|
| 5,333,246 | A | * | 7/1994 | Nagasaka        | 715/209 |
| 5,931,586 | A |   | 8/1999 | Kashiwazaki et al. |     |
| 6,665,081 | B1 | * | 12/2003 | Suzuki et al. | 358/1.13 |
| 2004/0130752 | A1 | * | 7/2004 | Gauthier | 358/1.18 |
| 2006/0092470 | A1 | * | 5/2006 | Yamada | 358/1.16 |
| 2008/0222462 | A1 | * | 9/2008 | Sakata | 714/704 |

FOREIGN PATENT DOCUMENTS

| JP | 04-128068 | 4/1992 |
| JP | 05-318829 | 12/1993 |
| JP | 05-324930 | 12/1993 |
| JP | 06-202824 | 7/1994 |
| JP | 07-089150 | 4/1995 |
| JP | 11-024866 | 1/1999 |
| JP | 2001-222396 | 8/2001 |

(Continued)

OTHER PUBLICATIONS

Office Action received for Japanese Application No. 2008-089613 mailed Jun. 29, 2010.
European Search Report for application No. 09250416.6 mailed Nov. 29, 2010.

(Continued)

*Primary Examiner* — Doug Hutton, Jr.
*Assistant Examiner* — Ariel Mercado
(74) *Attorney, Agent, or Firm* — Banner & Witcoff, Ltd.

(57) ABSTRACT

A page description language processing device is provided for supporting a plurality of types of page description languages. In one example, the device may be configured to read a command from data input and determine whether the command should be converted into a common intermediate code. If the judgment unit judges that the command should be converted into the common command, the controller may store a common intermediate command in the intermediate code storage unit. If the judgment unit judges that the command should not be converted into the common command, the controller may store a special intermediate command in the intermediate code storage unit. Additionally or alternatively, the device may execute a common module for the common intermediate command and a special module for the special intermediate command.

8 Claims, 16 Drawing Sheets

(56) References Cited

FOREIGN PATENT DOCUMENTS

| | | |
|---|---|---|
| JP | 2002-076979 | 3/2002 |
| JP | 2004-192038 | 7/2004 |
| JP | 2005-161756 | 6/2005 |

OTHER PUBLICATIONS

Office Action issued in corresponding European Patent Application No. 09 250 416.6 dated Nov. 26, 2012.

* cited by examiner

| CODE | NUMBER |
|---|---|
| COMMON CODE A | 0101 |
| COMMON CODE B | 0102 |
| COMMON CODE C | 0103 |
| COMMON CODE D | 0104 |
| COMMON CODE E | 0105 |
| COMMON CODE F | 0106 |
| COMMON CODE G | 0107 |
| COMMON CODE H | 0108 |
| ⋮ | ⋮ |

FIG. 4

| 0102<br>(COMMON CODE B) | 0105<br>(COMMON CODE E) | SPECIAL CODE 1 | SPECIAL CODE 2 | ... | 0104<br>(COMMON CODE D) |
|---|---|---|---|---|---|

FIG. 5

| CODE | ADDRESS |
|---|---|
| SPECIAL CODE 1 | MODULE ADDRESS 1 |
| SPECIAL CODE 2 | MODULE ADDRESS 2 |

FIG. 6

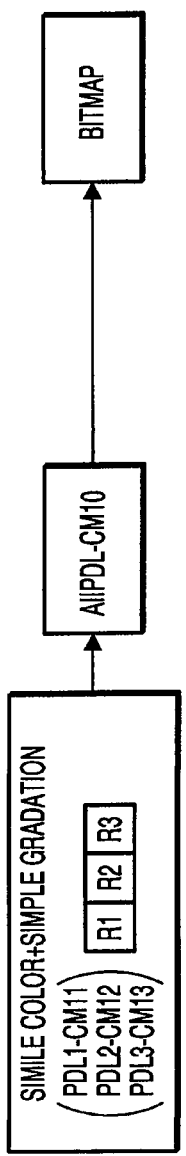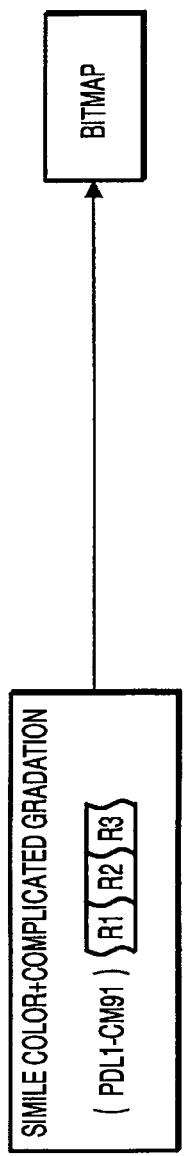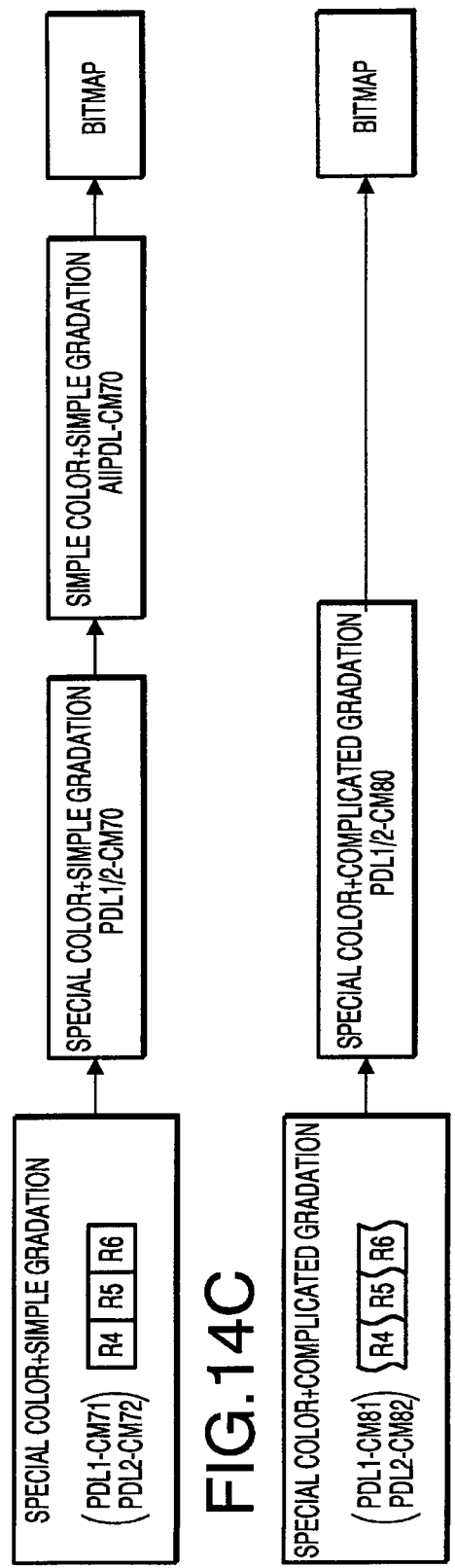

DEVICE, METHOD AND COMPUTER READABLE MEDIUM FOR PROCESSING COMMANDS IN DATA DESCRIBED USING A PAGE DESCRIPTION LANGUAGE

CROSS-REFERENCE TO RELATED APPLICATION

This application claims priority under 35 U.S.C. §119 from Japanese Patent Applications No. 2008-037130, filed on Feb. 19, 2008 and No. 2008-089613, filed on Mar. 31, 2008. The entire subject matter of the applications is incorporated herein by reference.

BACKGROUND

1. Technical Field

Aspects of the present invention relate to a device for processing a plurality of types of page description languages.

2. Related Art

Technologies for processing a plurality of types PDLs (Page Description Languages) have been proposed. Japanese Patent Provisional Publication No. HEI 4-128068A (hereafter, referred to as JP HEI 4-128068A) discloses an example of a device supporting a plurality of types of PDLs. The device disclosed in JP HEI 4-128068A is configured to have a plurality of types of page description language interpretation objects and to switch between the plurality of types of page description language interpretation objects in accordance with the type of the page description language inputted to the device.

SUMMARY

According to the configuration of the device disclosed in JP HEI 4-128068A, the device is able to support the plurality of types of page description language. However, in order to support the plurality of types of page description languages, the device is required to install thereon a plurality of types of PDL programs (page description language processing programs), which also requires the device to have a storage device with a large capacity for the PDLs programs.

It may be possible to use a common PDL program having a function of converting the plurality of types of page description languages into common intermediate language, and to process the common intermediate language. However, the plurality of types of page description languages are based on respective specifications, and therefore have expressive capabilities different from each other (e.g., an expressive capability for complicated gradation or a transparent process). In addition, a plurality of types of image formats exist. Therefore, in order to convert all of the plurality of types of page description languages into intermediate language data and to process the converted intermediate language data, a device needs to use a sophisticated program for converting the page description languages into intermediate codes. As a result, the data amount for the program increases. It should be noted that regarding processing of a page description language having a relatively poor expressing capability, use of such a sophisticated program is not desirable in regard to increase of a processing speed and the data amount for necessary programs.

Aspects of the present invention are advantageous in that at least one of device, method and computer readable medium for supporting a plurality of types of page description languages while achieving reduction in memory size and increasing a processing speed is provided.

According to an aspect of the invention, there is provided a page description language processing device, comprising: a data input unit configured to input data described in a page description language; a judgment unit configured to read a command from the data described in the page description language inputted through the data input unit and to judge whether the command should be converted into a common intermediate code; an intermediate code storage unit configured to store intermediate commands; a controller configured to store a common intermediate command corresponding to a command read from the inputted data in the intermediate code storage unit if the judgment unit judges that the command should be converted in the common intermediate command, and to store a special intermediate command corresponding to a command read from the inputted data in the intermediate code storage unit if the judgment judges that the command should not be converted into the common command; and an intermediate code execution unit configured to execute a common module for the common intermediate command read from the intermediate code storage unit, and to execute a special module for the special intermediate command read from the intermediate code storage unit.

According to this configuration, the common codes do not correspond to all of the codes of a page description language. That is, predetermined codes selected from all the codes of the page description language are used as the common codes. Therefore, it is possible to process the page description language described only by the common codes. It is also possible to process a page description language having complicated functions while saving memory consumption. It is also possible to decrease the data amount for programs.

In at least one aspect, the controller is configured to: execute a first module to process a common code corresponding to the common intermediate command; and execute a second module to process a code different from the common code. The page description language processing device further comprises: an interpreted code storage unit configured to store interpreted codes interpreted by the controller; a common code storage unit configured to store a common code to be converted into an intermediate code; and a module information storage unit configured to store information concerning the second module. In this configuration, the common code storage unit is configured to store the common code of the page description language and the intermediate code while associating the common code of the page description language and the intermediate code with each other. The controller is configured to execute a code writing process and a drawing process. As the code writing process, the controller operates to: read a code from the data inputted through the data input unit; if the read code is stored in the common code storage unit, write the intermediate code corresponding to the common code into the interpreted code storage unit; and if the read code is not stored in the common code storage unit, write an identification representing the read code to the interpreted code storage unit, and then write the identification and an address of the second module for processing the read code to the module information storage unit. As the drawing process, the controller operates to: read the code from the interpreted code storage unit; if the read code corresponds to the common code, execute the first module to generate image data; and if the read code does not correspond to the common code, obtain an address of the second module by referring to the module information storage unit, and to generate image data by executing the second module stored at the obtained address.

In at least one aspect, the controller is configured to: execute a first module to process a common code corresponding to the common intermediate command; and execute a second module to process a code different from the common code. The page description language processing device further comprises: a common code storage unit configured to store a common code to be converted into an intermediate code; a memory; and a module information storage unit configured to store information concerning the second module. The common code storage unit is configured to store the common code of the page description language and the intermediate code while associating the common code of the page description language and the intermediate code with each other. The controller is configured to execute an interpreted code memory area securing process, a module memory area securing process, a module information memory area securing process, a code writing process and a drawing process, and an area releasing process. As the interpreted code memory area securing process, the controller operates to secure an interpreted code memory area on a first area on the memory at first predetermined timing. As the module memory area securing process, the controller operates to secure a module memory area on the memory at second predetermined timing. As the module information memory area securing process, the controller operates to secure a module information memory area on the memory at third predetermined timing. As the code writing process, the controller operates to: read the code from the data inputted through the data input unit; if the read code is stored in the common code storage unit, write the intermediate code corresponding to the common code into the interpreted code storage unit; and if the read code is not stored in the common code storage unit, write an identification representing the read code to the interpreted code storage unit, and then write the identification and an address of the second module for processing the read code to the module information storage unit. As the drawing process, the controller operates to: read the code from the interpreted code storage unit; if the read code corresponds to the common code, execute the first module to generate image data; and if the read code does not correspond to the common code, obtain an address of the second module by referring to the module information storage unit, and to generate image data by executing the second module stored at the obtained address. As the area releasing process, the controller operates to release the interpreted code memory area, the module memory area and the module information memory area after reading codes corresponding to one page from the interpreted code memory area.

In at least one aspect, the page description language further comprises: an intermediate language creation program storage unit configured to store program having a function of converting a code described in a predetermined format into an intermediate code described in an intermediate language, for each of a plurality of types of page description languages; a first judgment unit configured to judge whether a description format describing data inputted through the data input unit corresponds to the program stored in the intermediate language creation program storage unit; an intermediate language data creation unit configured to generate data described in the intermediate language from the data inputted through the data input unit in accordance with the program stored in the intermediate language creation program storage unit in response to a fact that the first judgment unit judges that the description language describing the data inputted through the data input unit corresponds to the program stored in the intermediate language creation program storage unit; a first bitmap data creation unit configured to generate bitmap data from the data generated by the intermediate language data creation unit; and a second bitmap data creation unit configured to generate bitmap data from the data inputted through the data input unit in response to a fact that the first judgment unit judges that the description format describing the data inputted through the data input unit does not correspond to the program stored in the intermediate language creation program storage unit. The first bitmap data creation unit functions as the first module, and the second bitmap data creation unit functions as the second module.

According to another aspect of the invention, there is provided a method to be implemented on a page description language processing device, the method comprising the steps of: inputting data described in a page description language; reading a command from the inputted data described in the page description language; judging whether the command should be converted into a common intermediate code; storing a common intermediate command corresponding to a command read from the inputted data in an intermediate code storage unit if it is judged that the command should be converted in the common intermediate command; storing a special intermediate command corresponding to a command read from the inputted data in the intermediate code storage unit if it is judged that the command should not be converted into the common command; executing a common module for the common intermediate command read from the intermediate code storage unit; and executing a special module for the special intermediate command read from the intermediate code storage unit.

According to this configuration, the common codes do not correspond to all of the codes of a page description language. That is, predetermined codes selected from all the codes of the page description language are used as the common codes. Therefore, it is possible to process the page description language described only by the common codes. It is also possible to process a page description language having complicated functions while saving memory consumption. It is also possible to decrease the data amount for programs.

According to another aspect of the invention, there is provided a computer readable medium having computer readable instruction stored thereon, which, when executed by a processor of a page description language processing device, configures the processor to perform the steps of: inputting data described in a page description language; reading a command from the inputted data described in the page description language; judging whether the command should be converted into a common intermediate code; storing a common intermediate command corresponding to a command read from the inputted data in an intermediate code storage unit if it is judged that the command should be converted in the common intermediate command; storing a special intermediate command corresponding to a command read from the inputted data in the intermediate code storage unit if it is judged that the command should not be converted into the common command; executing a common module for the common intermediate command read from the intermediate code storage unit; and executing a special module for the special intermediate command read from the intermediate code storage unit.

According to this configuration, the common codes do not correspond to all of the codes of a page description language. That is, predetermined codes selected from all the codes of the page description language are used as the common codes. Therefore, it is possible to process the page description language described only by the common codes. It is also possible to process a page description language having complicated functions while saving memory consumption. It is also possible to decrease the data amount for programs.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 4 illustrates an example of a common intermediate code table.

FIG. 5 illustrates an example of a data structure of an intermediate code buffer.

FIG. 6 illustrates an example of a data structure of an intermediate code registration table.

FIGS. 14A-14D are explanatory illustrations for explaining processes where PDL data is converted into another type of data.

DETAILED DESCRIPTION

Figure 1:
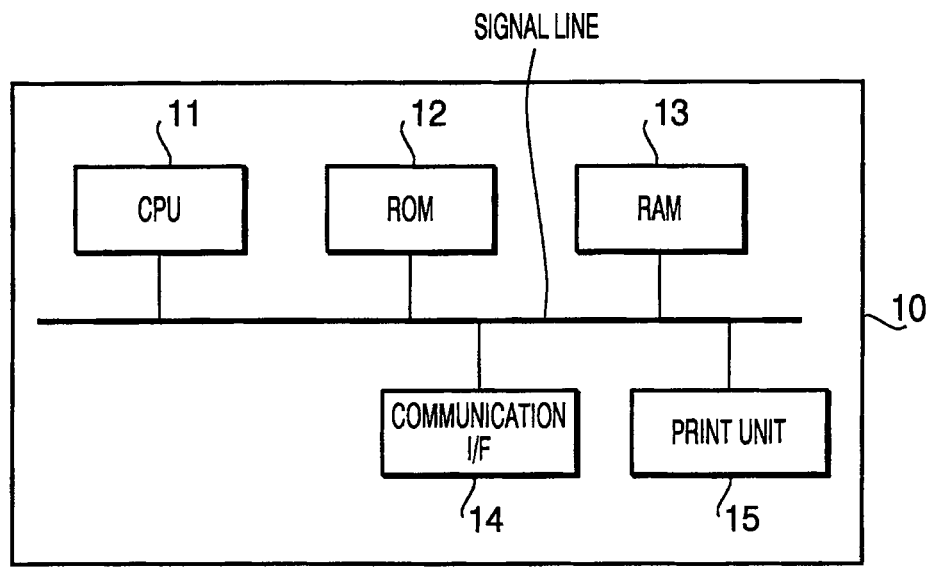
FIG. 1 is a block diagram of a printer according to a first embodiment.

Hereafter, embodiments according to the invention will be described with reference to the accompanying drawings.

The terms "gradation" and "text" described below are examples used for the purpose of easy understanding of the embodiments. The embodiments are not limited to such examples. Many PDLs are able to describe the same type of data. For example, many PDLs are able to describe liner gradation and text. In this point of view, in the embodiments described below, vector data described in an intermediate language is generated from vector data described in PDL, and bitmap data is generated from the vector data described in the intermediate language. That is, vector data described in various types of page description languages is converted into vector data described in the intermediate language before generating bitmap data.

For example, when the same liner gradation (e.g., gradation where color gradually changes, from red to blue, from a left side toward a right side on an image) is described in each of a first type PDL and a second type PDL, vector data described in an intermediate language is generated from the liner gradation described in the first type PDL and vector data described in the same intermediate language is generated from the liner gradation described in the second type PDL. In this case, the same vector data described in the intermediate language is generated. Therefore, a program having a function of converting the vector data described in the intermediate language is able to generate bitmap data for each of the liner gradations of the first type PDL and the second type PDL.

In this example, a first program for generating vector data described in the intermediate language from the gradation described in the first type PDL, a second program for generating vector data described in the intermediate language from the liner gradation described in the second type PDL, and a third program for generating bitmap data from the vector data described in the intermediate language are required. That is, the third program for generating bitmap data from the vector data of the liner gradation can be used as a common program common to the first type PDL and the second type PDL for generating bitmap data. Although the above described example needs to use the first program and the second program, the program for converting the vector data (PDL) into vector data (intermediate language) does not require a large data amount for programs. It should be noted that the data amount of the program for generating bitmap data from the vector data is larger than that of the program for converting the vector data described in PDL into vector data described in the intermediate language. In the above described example, although the first and second programs are required, the total data amount for programs can be decreased in comparison with the configuration of the device disclosed in JP HEI 4-128068A.

Recently, vector data can be described in various types of formats (i.e., various types of expressive functions). For example, in addition to the liner gradation, a PDL having a format capable of describing non-liner gradation has been proposed. That is, there exists a special format supported only by a single type PDL (or a few types of PDLs). For example, there may be a case where only the first type PDL is able to use a format describing non-liner gradation and the other type PDL (i.e. the second type PDL) is not able to describe the non-liner gradation. In this example, if a way for converting all of the formats that the plurality of types of PDLs have into data of an intermediate language is adopted, a program for generating vector data described in the intermediate language from vector data of the non-liner gradation described in the first type PDL, and a program for generating bitmap data from the vector data are required. The program for generating bitmap data from the vector data of one PDL can not be shared with the other PDLs because the other PDLs are not able to describe the non-liner gradation. In this case, regarding the non-liner gradation, it is not necessary to decrease the data amount for necessary programs even though the way for converting vector data into the intermediate language is adopted. Instead, such a configuration leads to increase of the data amount for programs because a program for generating vector data described in the intermediate language from the vector data of the non-liner gradation is required.

The inventors of this application find a fact that it is possible to decrease the total data amount for programs by not converting a special format, which only a single type of PDL (or a few types of PDLs) supports, into the intermediate language.

First Embodiment

FIG. 1 is a block diagram of a printer 10 according to a first embodiment. As shown in FIG. 1, the printer 10 includes a CPU 11, a ROM 12, a RAM 13, a communication I/F (interface) 14, and a print unit 15. The CPU 11 is able to execute a PDL processing program and an intermediate code processing program which are described later. The ROM 12 stores the PDL processing program and the intermediate code processing program. When these programs are executed, various types of data is written to or read from the RAM 13. The printer 10 receives PDL data from an external computer via the communication I/F 14. Image data is generated by executing the intermediate code processing program. The image data thus generated is then subjected to a print process by the print unit 15. The above described components are connected with each other via signal lines. It should be noted that FIG. 1 shows an example of a configuration of a printer. Various types of configurations can be adopted as a configuration of the printer 10.

Figure 2:
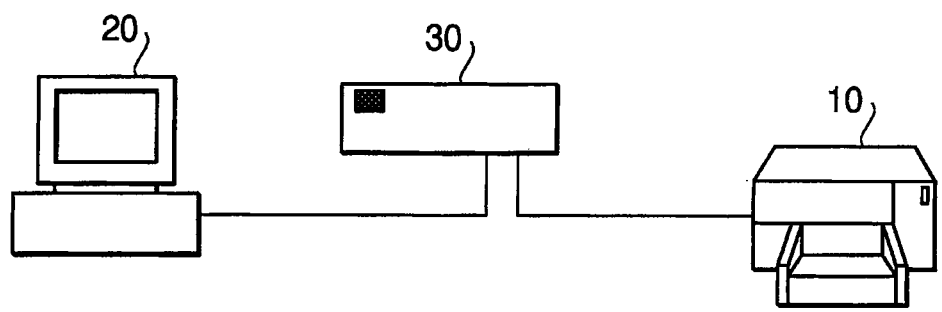
FIG. 2 shows a system configuration including the printer, a computer and a router.

FIG. 2 shows a system configuration including the printer 10, a computer 20 and a router 30. The printer 10 is connected to the computer 20 via the router 30. In this system, data described in PDL is transmitted from the computer 20 to the printer 10.

Hereafter, various programs executed on the printer 10 are explained. The programs stored in the printer 10 are classified into two types of programs including the PDL processing program and the intermediate code processing program.

The PDL processing program has the functions of interpreting PDL data and converting it into intermediate codes (common codes and special codes). The intermediate code processing program has the functions of generating image data based on the intermediate codes interpreted by the PDL processing program. The processing of the PDL processing program and the processing of the intermediate code processing program may be executed sequentially as a series of programs.

An image corresponding to the image data generated by the intermediate code processing program is printed through the print unit 15 of the printer 10. If the printer 10 is configured as a laser beam printer, a laser printing engine is employed as the print unit 15.

Figure 3:
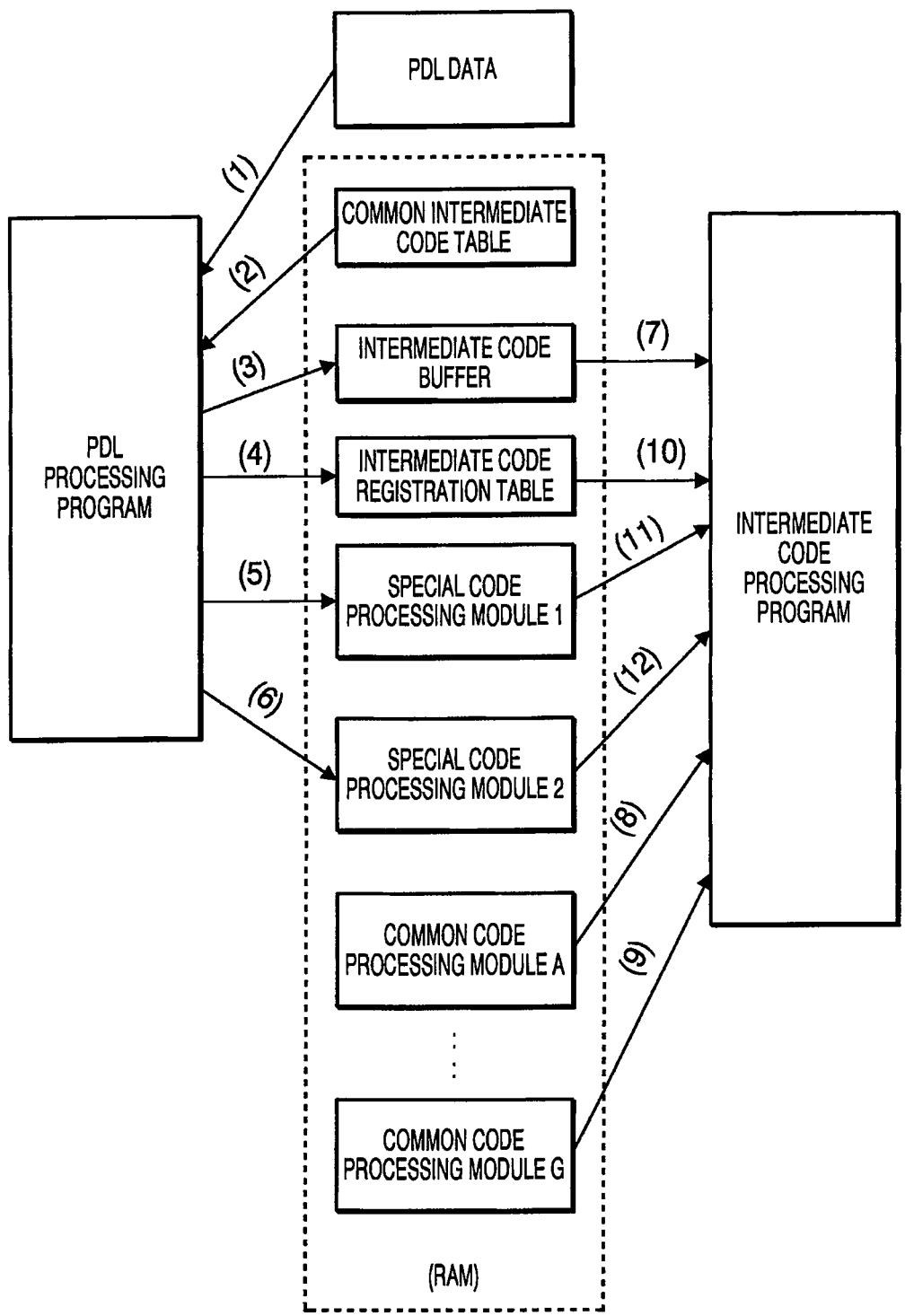
FIG. 3 illustrates a flow of processing of a PDL processing program and an intermediate code processing program.

FIG. 3 illustrates a flow of processing of the PDL processing program and the intermediate code processing program. As illustrated in FIG. 3, the intermediate code processing program reads information which is written to the RAM 13 by the PDL processing program, and processes the read information.

The PDL processing program obtains the PDL data (step (1)). The PDL processing program supports various types of PDL data. The PDL processing program interprets sequentially codes (commands) contained in the obtained PDL data. In this case, the PDL processing programs refers to a common intermediate code table stored in the RAM 13 (step (2)).

FIG. 4 illustrates an example of the common intermediate code table. As shown in FIG. 4, codes which the intermediate code processing program is able to process are stored as "common codes". In the common intermediate code table, numbers are assigned to the common codes, respectively. The common intermediate code table is written to the RAM 13 at predetermined timings.

One of the codes defined as the common codes is a command for drawing letters. Each common code has a high degree of versatility, i.e., each common code has a high possibility of being used by a plurality of types of PDLs.

When the PDL processing program judges that a target code (a target to be interpreted) is contained in the common intermediate code table, the PDL processing program writes the common code corresponding to the target code to an intermediate code buffer (step (3)). In this case, the PDL processing program may write a number corresponding to the common code to the intermediate code buffer.

When the PDL processing program judges that the target code is not contained in the common intermediate code table, the PDL processing program writes the target code and an address of a module (hereafter, referred to as a module address) for the target code to the intermediate code registration table (steps (4), (5), and (6)). The module for the code has been loaded in the RAM 13. The PDL processing program writes the code in the intermediate code buffer as a "special code" (step (3)).

FIG. 5 illustrates an example of a data structure of the intermediate code buffer. As shown in FIG. 5, in the intermediate code buffer, intermediate codes converted by the PDL processing program are written sequentially. FIG. 5 illustrates that codes in the PDL data obtained in step (1) have been interpreted as "common code B"→"common code E"→"special code 1"→"special code 2"→ . . . →"common code D".

FIG. 6 illustrates an example of a data structure of an intermediate code registration table. As shown in FIG. 6, in the intermediate code registration table, special data contained in the PDL data is stored in association with a module address. The special code processing module is written to the RAM 13 at predetermined timings.

A code defined as a special code includes a command for representing gradation. The special codes are used for special purposes. Therefore, the special code does not have a high degree of versatility.

As described above, the PDL processing program interprets the code of the obtained PDL data, and writes a result of the interpretation to the intermediate code buffer. If the PDL processing program interprets the special code, the PDL processing program writes a process module for the special code to the RAM 13. Then, the PDL processing program writes an address of the module to the intermediate code registration table. The information stored in the intermediate code registration table is used by the intermediate code processing program.

The intermediate code processing program accesses the intermediate code buffer, and reads codes sequentially from the intermediate code buffer. If the read code is the common code, the intermediate code processing program executes a common code process module corresponding to the obtained code (steps (8), (9)). As described above, the intermediate code processing program is able to generate image data corresponding to the code (i.e., to draw an image corresponding to the image data).

If the read code is the special code (steps (11), (12)), the intermediate code processing program is able to obtain a module address of the special code by referring to the intermediate code registration table (step (10)). Then, the intermediate code processing program executes the module (special code processing module) corresponding to the obtained module address (steps (11), (12)). As described above, the intermediate code processing program is able to generate image data corresponding to the code (i.e., to draw an image corresponding to the image data).

Figure 7:
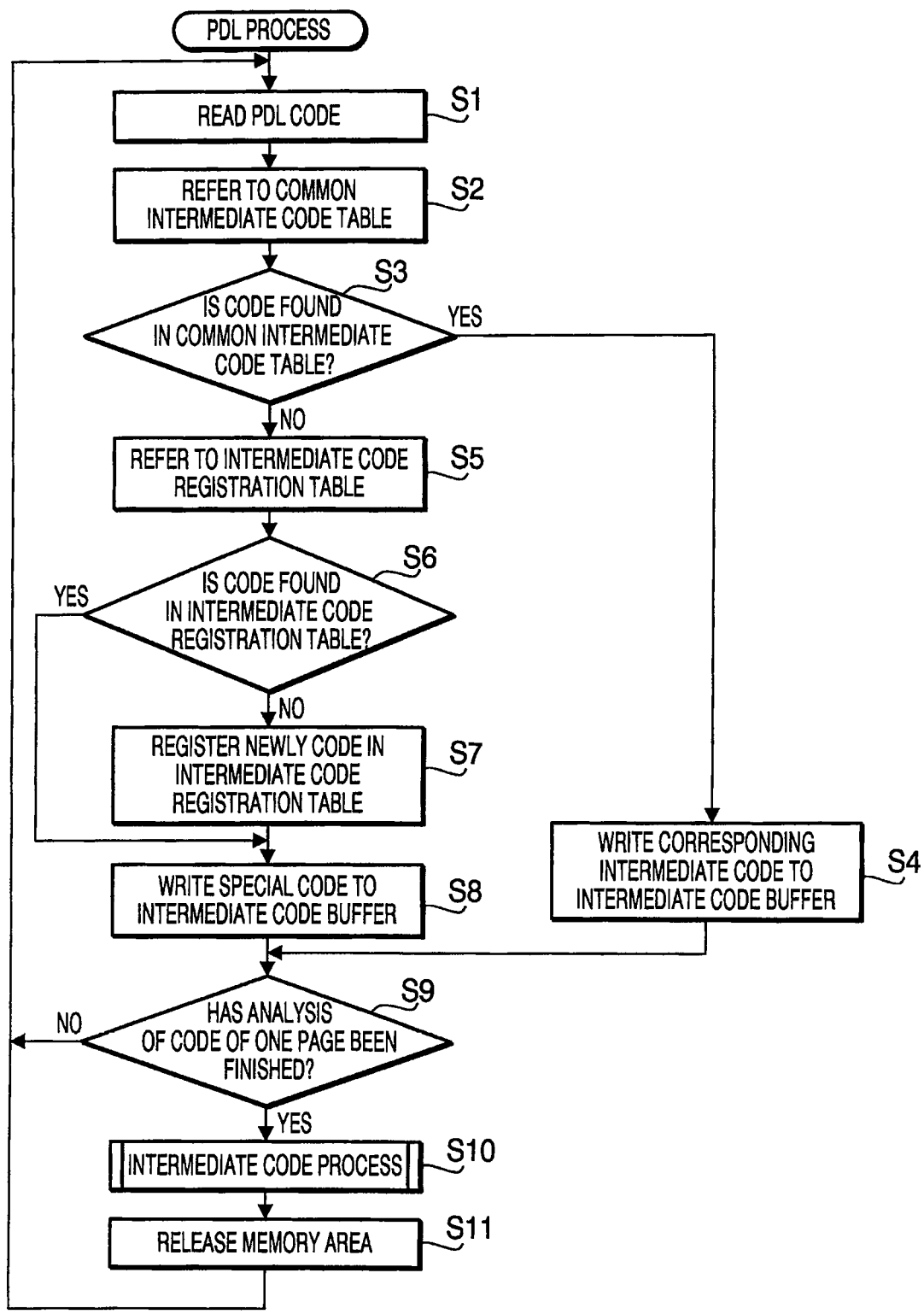
FIG. 7 is a flowchart illustrating a PDL processing program.

Hereafter, the PDL processing program is explained in detail. FIG. 7 is a flowchart illustrating the PDL processing program. The PDL processing program is executed by the CPU 11 of the printer 10. The PDL processing program interprets sequentially PDL codes contained in the PDL data, and writes the common code or the special code obtained as a result of the interpretation to the intermediate code buffer.

When the PDL processing is started, the CPU 11 reads a PDL code from the obtained PDL data (step S1). Then, the CPU 11 refers to the common intermediate code table to judge whether the PDL code exists in the common intermediate code table. That is, the CPU 11 judges whether the obtained code is the common code (i.e., a command for executing a common code processing module which the intermediate code processing program has) or the special code (i.e., a command for executing a module which has not been provided for the intermediate code processing program in advance).

If the CPU 11 judges that the obtained code is found in the common intermediate code table (S3: YES), control proceeds to step S4. In step S4, the CPU 11 writes a corresponding intermediate code to the intermediate code buffer. The intermediate code buffer is secured, for example, in the RAM 13. Regarding timing for securing the intermediate code buffer, the CPU 11 may secure a certain size of memory area for the intermediate code buffer, when the CPU 11 makes a judgment of "YES" at step S3 or the CPU 11 may secure a predicted amount of memory area for the intermediate code buffer at a time of starting execution of the PDL processing program.

On the other hand, if the obtained PDL code is not found in the common intermediate code table (i.e., if the CPU 11 judges that the obtained PDL code is the special code) (S3: NO), control proceeds to step S5. In step S5, the CPU 11 refers to the intermediate code table to judge whether the obtained PLD code has been contained in the intermediate registration code table.

If the obtained PDL code is not found in the intermediate code registration table (S6: NO), control proceeds to step S7. In step S7, the CPU 11 writes the obtained PDL code to the intermediate code registration table as a special code. Further, the CPU 11 writes a module address corresponding to the special code to the intermediate code registration table while associating the module address with the special code (see FIG. 6). The intermediate code registration table is secured, for example, in the RAM 13.

Regarding timing for securing the intermediate code registration table on the RAM 13, the CPU 11 may secure a certain size of memory area for the intermediate code registration table each time the CPU 11 makes a judgment of "NO" at step S6, or the CPU 11 may secure a predicted amount of memory area for the intermediate code registration table at a time of starting execution of the PDL processing program. The code corresponding to the PDL code may be written to the RAM 13 at predetermined timing. Regarding the predetermined timing, the module may be written to the RAM 13 at step S7.

On the other hand, if the obtained PDL code is found in the intermediate code registration table (S6: YES), control proceeds to step S8. That is, in this case, if the special code and the module address corresponding to the obtained PDL data have been stored in the intermediate code registration table, there is no necessity to newly register a PDL code in the intermediate code registration table.

In step S8, the CPU 11 writes the obtained PDL code to the intermediate code buffer as a special code. In this case, the CPU 11 may write an identification number identifying the special code to the intermediate code buffer.

In step S9, the CPU 11 judges whether PDL codes for one page have been interpreted. If the PDL codes for one page have been interpreted (S9: YES), control proceeds to step S10. On the other hand, if interpretation of PDL codes for one page has not been finished (S9: NO), control returns to step S1 to read a next PDL code.

In step S10, the CPU 11 executes an intermediate code process which is described later. In step S11, the CPU 11 releases the intermediate code buffer, the intermediate code registration table and the special module from the respective memory areas.

As described above, in the PDL process, securing or releasing of necessary memory areas are executed on the basis of a unit of processes handling PDL data for one page. Such a configuration makes it possible to use a memory (e.g., the RAM 13) effectively.

Figure 8:
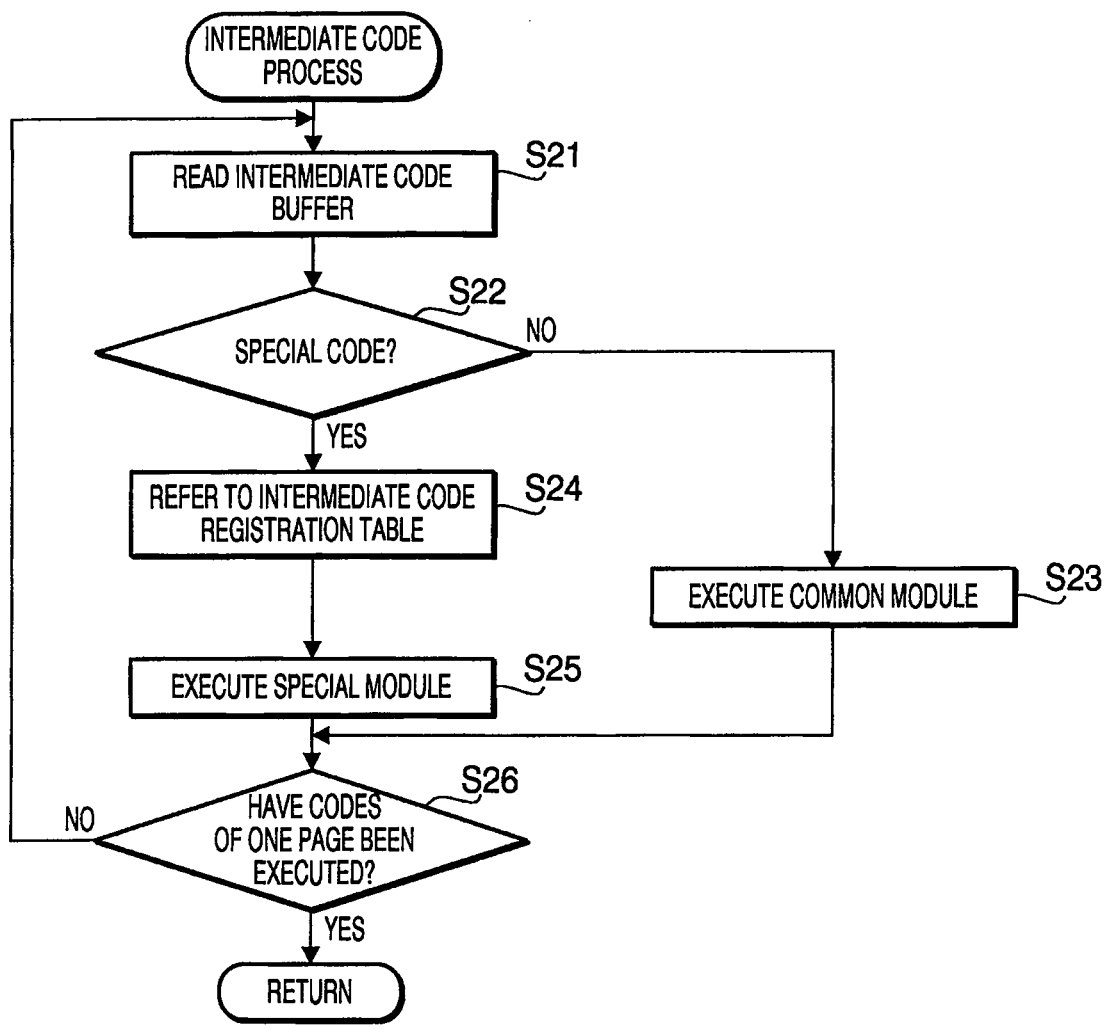
FIG. 8 is a flowchart of an intermediate code process.

Hereafter, the intermediate code processing program is explained. FIG. 8 is a flowchart of an intermediate code process. The intermediate code process is executed when called from the PDL process shown in FIG. 7. In the intermediate code process, the CPU 11 reads intermediate codes sequentially from the intermediate code buffer, and executes the obtained intermediate code to generate image data.

When the intermediate code process is started, the CPU 11 reads an intermediate code from the intermediate code buffer (step S21). In step S22, the CPU 11 judges whether the obtained code is a special code. The CPU 11 may make a judgment in step S22 by referring to the common intermediate code table (see FIG. 4). If the CPU 11 judges that the obtained intermediate code is not the special code (i.e., the intermediate code is a common code) (S22: NO), control proceeds to step S23.

In step S23, the CPU 11 executes the module corresponding to the common code to generate image data. The generated image data is then stored temporarily in a certain area of the RAM 13. The module corresponding to the common code has been loaded on the RAM 13.

If the CPU 11 judges that the obtained code is the special code (S22; YES), control proceeds to step S24. In step S24, the CPU 11 accesses the intermediate code registration table (see FIG. 6), to determine the module address for the special code. In step S25, the CPU 11 executes the module at the address determined in step S24 to generate image data. The generated image data is stored temporarily in a certain area of the RAM 13.

In step S26, the CPU 11 judges whether codes for one page have been executed. If execution for the codes for one page has not been finished (S26: NO), control returns to step S21 to read a next code. On the other hand, execution of codes for one page has been finished (S26: YES), the intermediate code process terminates. A page of image data generated as above is then passed to the print unit 15 to be printed, for example, on a sheet of paper.

As described above, in the intermediate code process, the intermediate code (the common code or the special code) is executed on the basis of a unit of PDL data. Such a configuration makes it possible to use a memory (e.g., the RAM 13) effectively.

As described above, according to the PDL process and the intermediate code process, after the process for a page of PDL data is finished, the memory areas for the intermediate code buffer, the intermediate code registration table and the special module are released.

Figure 9:
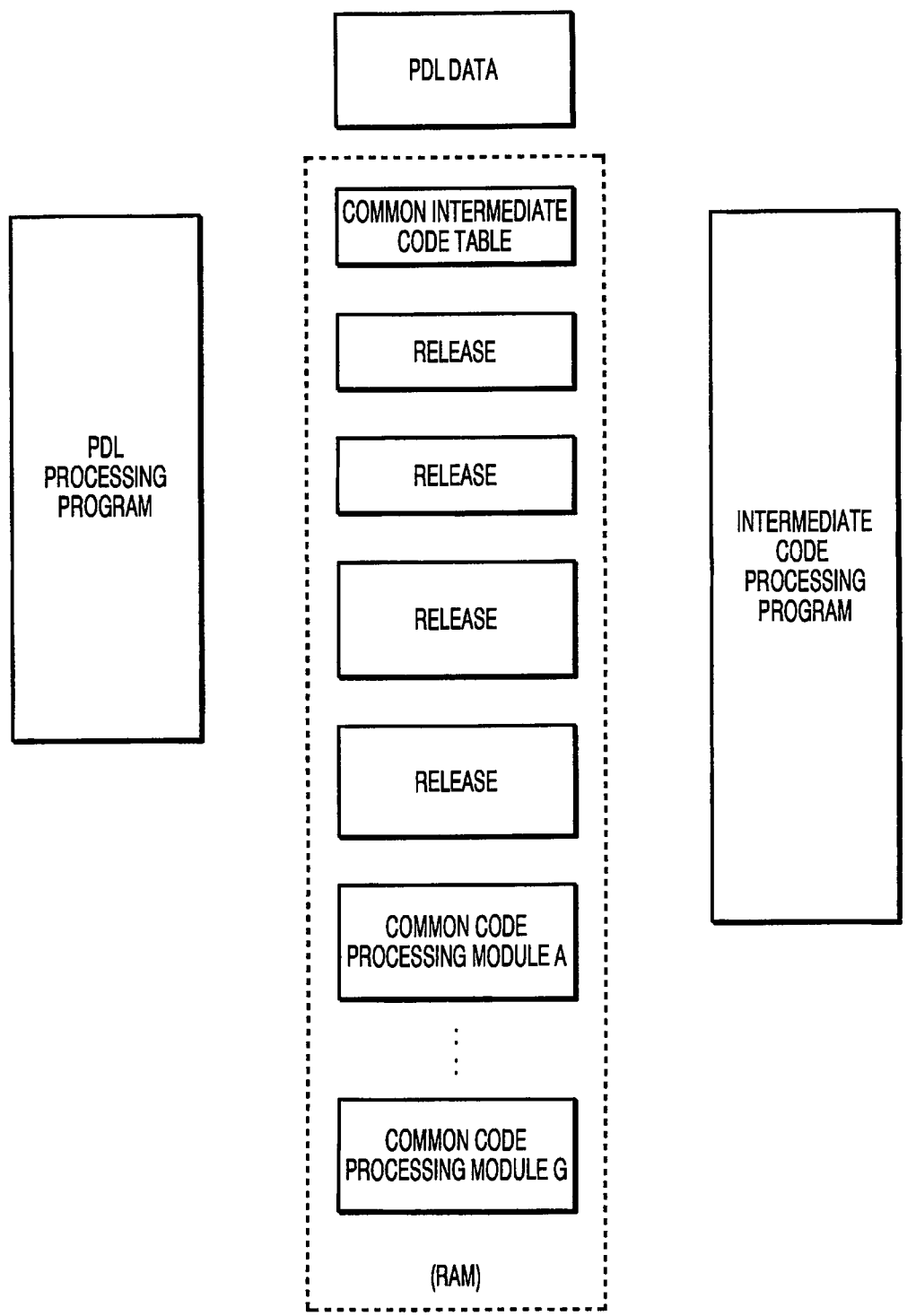
FIG. 9 illustrates a situation where memory areas have been released after execution of a process for PDL data.

FIG. 9 illustrates a situation where the memory areas have been released after execution of the process for the PDL data. As shown in FIG. 9, memory areas for the intermediate code buffer, the intermediate code registration table, a special code processing module 1 and a special code process module 2 (see FIG. 3) have been released.

Figure 10:
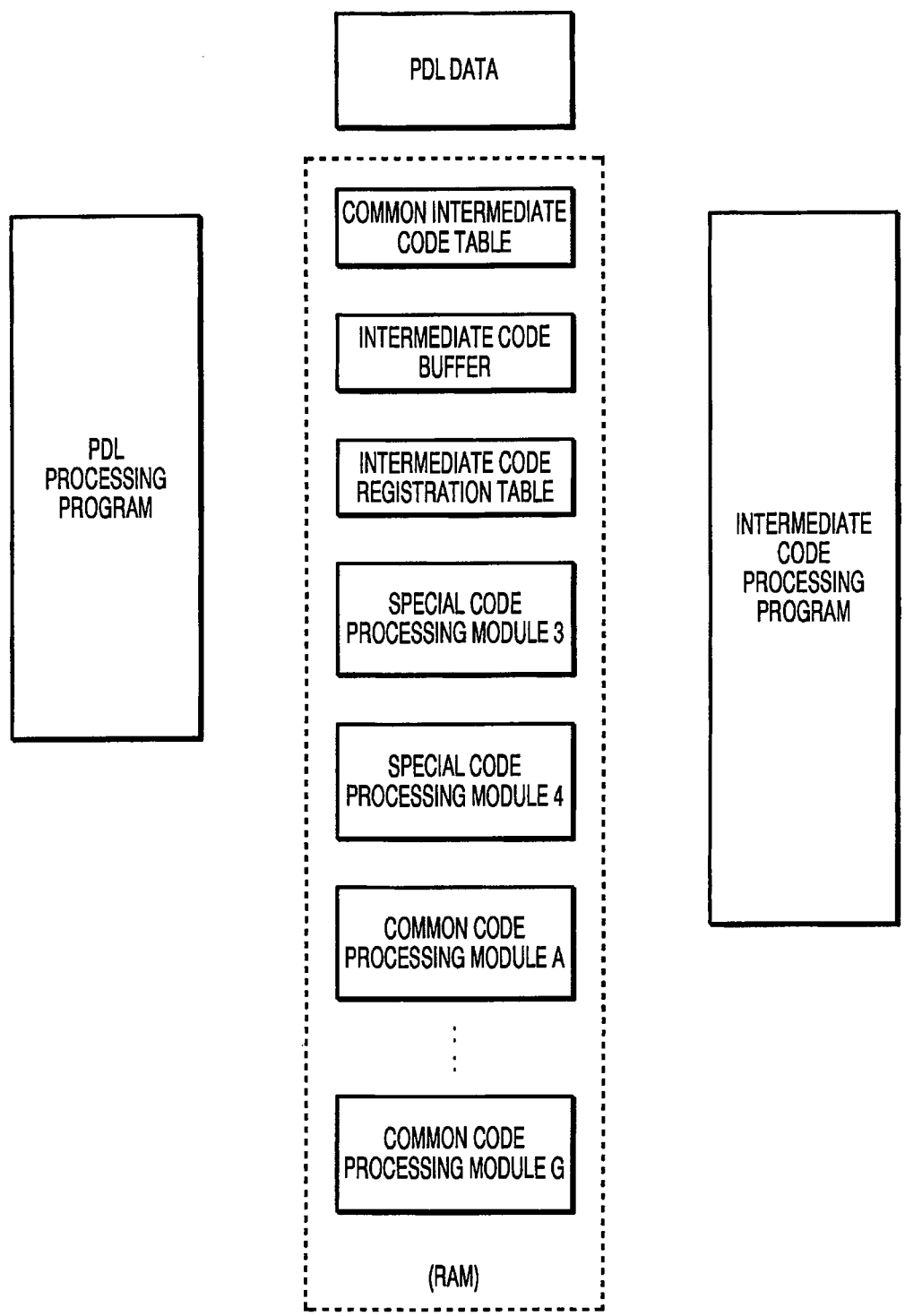
FIG. 10 illustrates a situation where memory areas for an intermediate code buffer, an intermediate code registration table, a special code processing module and a special code processing module have been newly secured in a RAM.

FIG. 10 illustrates a situation where memory areas for the intermediate code buffer, the intermediate code registration table, a special code processing module 3 and a special code processing module 4 have been newly secured in the RAM 13. As shown in FIG. 10, on the memory areas which have been secured in FIG. 3, the intermediate code buffer, the intermediate code registration table, the special code processing module 3 and the special code processing module 4 are newly secured. It should be noted that contents in the intermediate code buffer and the intermediate code registration table in FIG. 10 are different from those of the intermediate code buffer and the intermediate code registration table in FIG. 3.

As described above, the CPU 11 repeats securing and releasing of the memory areas on the basis of a process for a page of PDL data. Such a configuration makes it possible to save the memory area, and thereby to effectively use memory areas. It should be noted that although in the above described embodiment securing and releasing of memory areas are performed on the basis of a process for a page of PDL data, the securing and releasing of memory areas may be performed on the basis of processes corresponding to a plurality of pages of PDL data.

Figure 11:
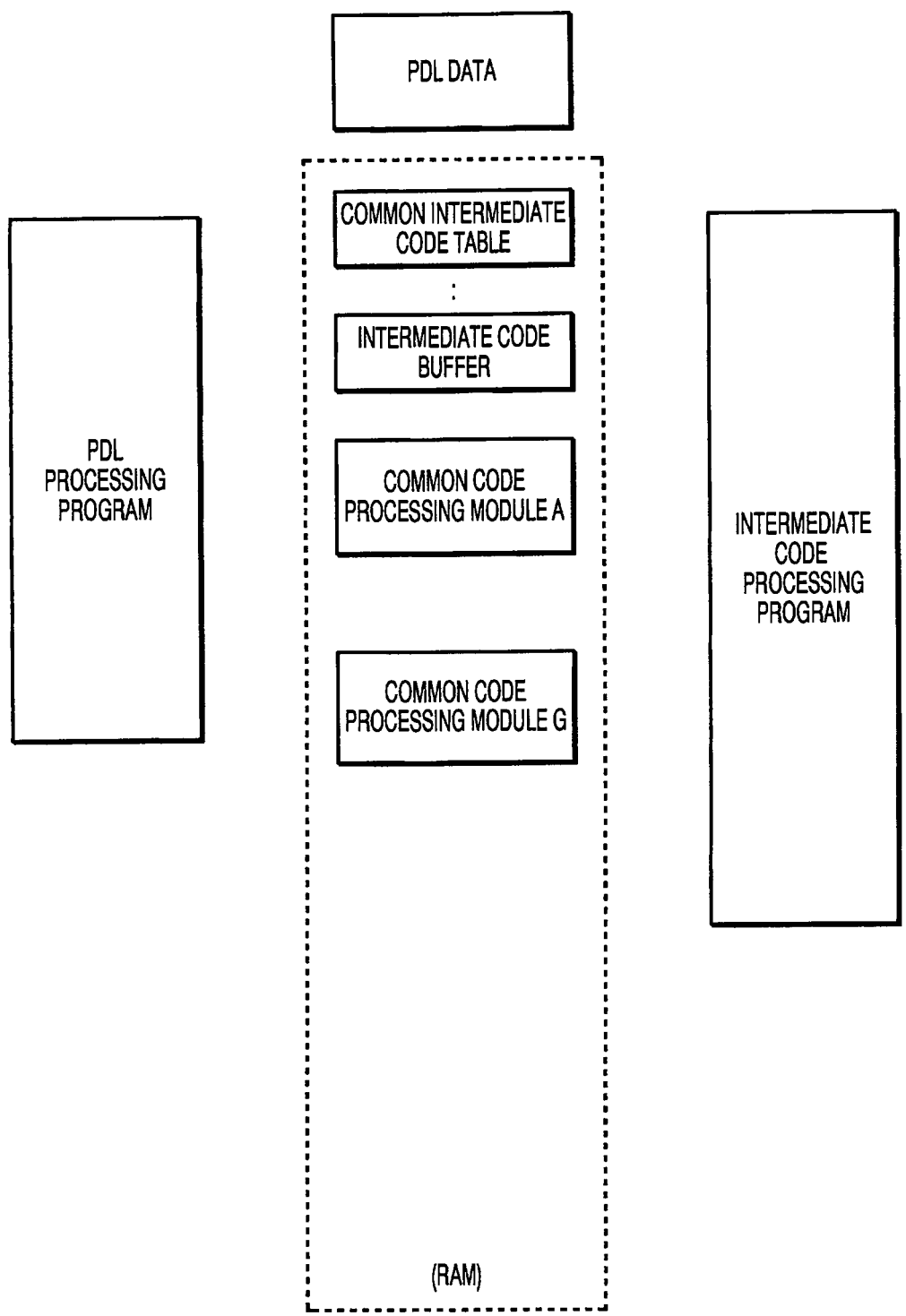
FIG. 11 illustrates memory areas in the RAM in a situation where PDL data formed only by the common codes has been processed.

If the PDL data as a process target includes only the common code type, there is no necessity to secure memory areas for the intermediate code registration table and the special code module. FIG. 11 illustrates memory areas in the RAM 13 in a situation where PDL data formed only by the common codes has been processed. As shown in FIG. 11, the memory area for the intermediate code buffer is secured, but the memory areas for the intermediate code registration table and the special code processing module are not secured.

As described above, when the PDL data including only the type of the common code is processed, the memory amount to be secured can be decreased.

As described above, according to the first embodiment, the CPU 11 interprets sequentially the PDL codes, and converts the PDL codes into the common codes or the special codes. Regarding the special code, the CPU 11 writes a special code processing module corresponding to the PDL code to a memory while associating the code with an address of the special code processing module.

With this configuration, it becomes possible to save memory consumption and to increase a processing speed while supporting a plurality of types of page description languages. It is also possible to decrease the size of each program.

Regarding the PDL data including only the common code type, it is possible to decrease the size for a memory area to be secured on a memory. Regarding the PDL data including the special code, it is possible to secure and release a memory area for a special code processing module required for execution of the special code, on the basis of a unit of a page.

When a common code is to be added, it is possible to add a common code processing module corresponding to the common code while altering the common intermediate code.

Second Embodiment

Figure 12:
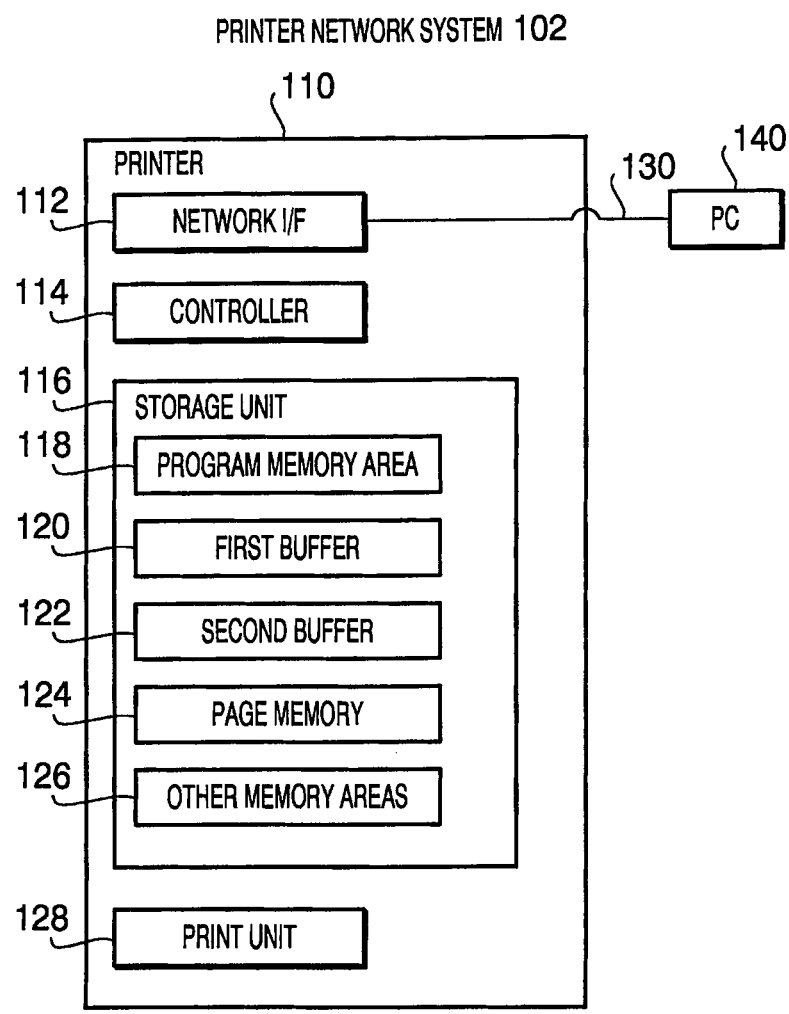
FIG. 12 illustrates a configuration of a network system according to a second embodiment.

Hereafter, a second embodiment is described. FIG. 12 illustrates a configuration of a printer network system 102 according to the second embodiment. The network system 102 includes a printer 110 and a PC (personal computer) 140 which are connected to each other via a communication line 130. The PC 140 stores a plurality of pieces of data, and is configured to be able to instruct the printer 110 to print data files in response to a user operation. In this case, the PC 140 converts a data file into PDL in response to a user command and sends the data file described in PDL to the printer 110.

FIG. 12 also illustrates a block diagram of the printer 110. As shown in FIG. 12, the printer 110 includes a network interface 112, a controller 114, a storage unit 116, and a print unit 128. The network interface 112 is connected to the communication line 130 to interface the printer 110 with the PC 140. Through the communication line 130, the printer 110 is able to communicate with the PC 140. The controller 114 executes various processes in accordance with programs stored in the storage unit 116. The processes executed by the controller 114 are described in detail later.

The storage unit 116 includes various types of memories including a ROM, an EEPROM, and a RAM. More specifically, the storage unit 116 includes a program memory area 118, a first buffer 120, a second buffer 122, a page memory 124 and another memory area 126. The program memory area 118 stores various types of programs which are described in detail later. The first and second buffers 120 and 122 are used in a PDL conversion process which is descried later. The page memory 124 stores bitmap data to be printed on a page of print medium. The memory area 126 stores information other than information stored in the memory areas 118, 120, 122 and 124. The print unit 128 includes a mechanism configured to carry a print medium and a mechanism configured to form an image on a print medium (e.g., an inkjet image formation mechanism or a laser image formation mechanism). The print unit 128 forms an image on a print medium in accordance with BMP data for print stored in the page memory 124.

As described in detail below, the printer 110 converts vector data (hereafter, frequently referred to as PDL data) described in PDL into vector data described in intermediate language (hereafter, frequently referred to as intermediate language data). Then, the printer 110 converts the intermediate language data into multiple gray scale bitmap data (hereafter, frequently referred to as BMP data), and stores the multiple gray scale bitmap data in the page memory 124.

Figure 13:
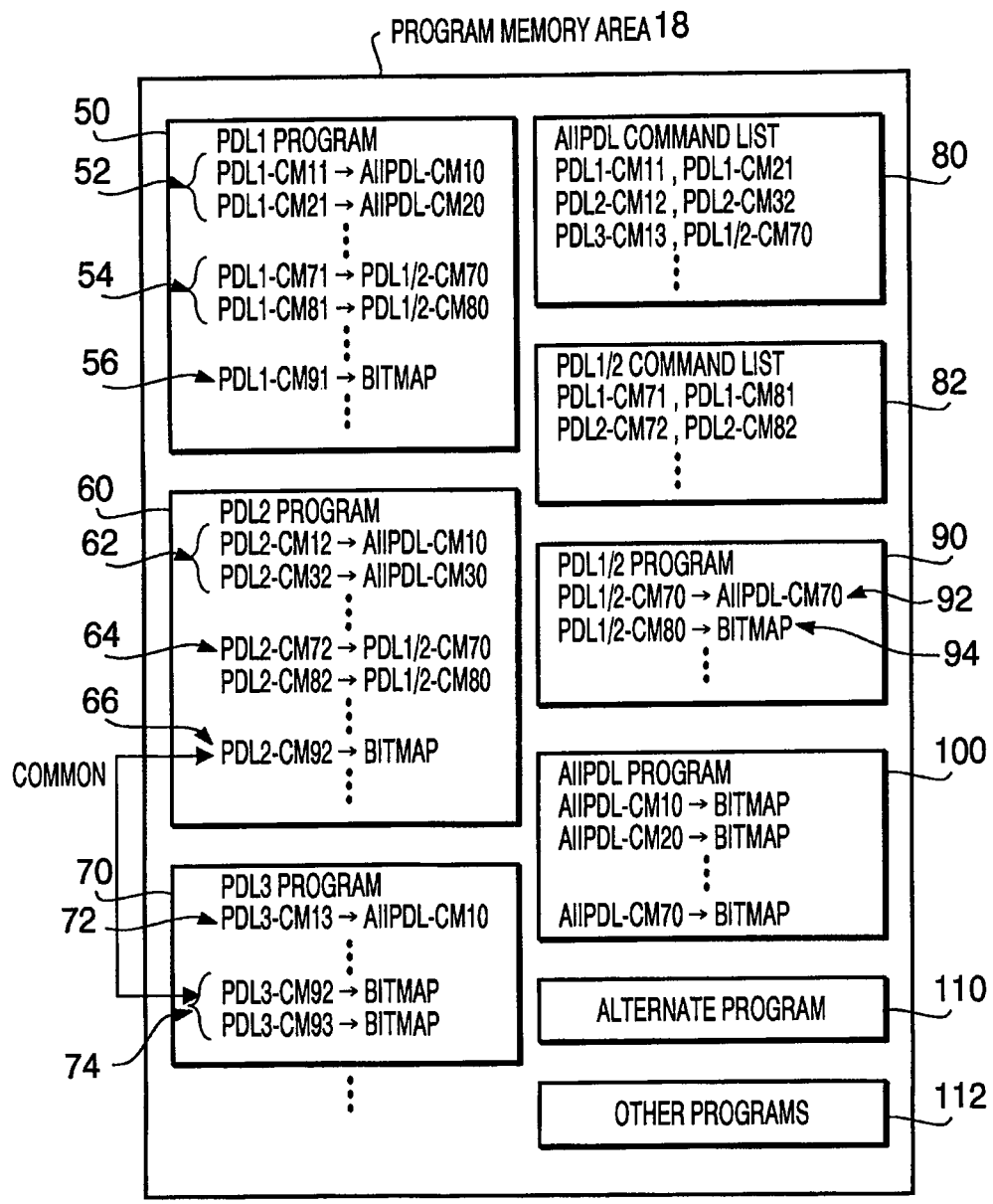
FIG. 13 illustrates contents in a program memory area of a printer.

Hereafter, programs stored in the program memory area 118 are explained. FIG. 13 illustrates contents in the program memory area 118. As shown in FIG. 13, the program memory area 118 includes a PDL1 program 50, a PDL2 program 60 and a PDL3 program 70. The PDL1 program 50 processes PDL of a first type (hereafter, referred to as a first type PDL or PDL1), the PDL2 program 60 processes PDL of a second type (hereafter, referred to as a second type PDL or PDL2), and the PDL3 program 70 processes PDL of a third type (hereafter, referred to as a third type PDL). Although in this embodiment the program memory area 118 stores only three types of programs for processing three types of PDLs, four or more types of programs for processing four or more types of PDLs may be stored in the program memory area 118.

The PDL1 program 50 includes programs 52, 54 and 56 each of which has a function of converting a command to another type of data. The programs 52, 54 and 56 are described in detail below.

The program 52 converts a command used in PDL1 into data described in an intermediate language. In FIG. 13, as an example, a program for converting a command CM1 of PDL1 (PDL1-CM11) into a common intermediate language command CM 10 (AllPDL-CM10) (hereafter, referred to as "all PDL common intermediate language") which is shared among all of the types of PDLs.

The program 54 converts a command used in PDL1 into data described an intermediate language (hereafter, referred to as "PDL1/PDL2 common intermediate language") which is common only to PDL1 and PDL2. In FIG. 13, as an example of the program 54, a program which converts a command CM71 of PDL1 (PDL1-CM71) into a command CM70 of PDL1/2 common intermediate language (PDL1/2-CM70) is illustrated.

The PDL2 program 60 includes programs 62, 64 and 66 each of which has a function of converting a command into another type of data. The program 62 converts a command used in PDL2 (e.g., PDL2-CM2) into "all PDL common intermediate language" (e.g., AllPDL-CM10). The program 64 converts a command used in PDL2 (e.g., PDL2-CM72) into "PDL1/2 common intermediate language" (e.g., PDL1/2-CM70). The program 66 converts a command used in PDL2 (e.g., PDL2-CM92) into BMP data.

The PDL3 program includes programs 72 and 75 each of which has a function of converting a command into another type of data. The program 72 converts a command used in PDL 3 (e.g., PDL 3-CM13) into "all PDL common intermediate language" (e.g., AllPDL-CM10). The program 74 converts a command used PDL3 (e.g., PDL3-CM92) into BMP data. It should be noted that the PDL3 program 70 does not include a program which converts a command into "PDL1/2 common intermediate language".

As can be seen from FIG. 13, the PDL2 and PDL3 use a command CM 92 which has a common concept common to PDL2 and PDL3. In this embodiment, when a command which is common to a plurality of types of PDLs is used, a common program is used for converting such a command into another type of data. That is, a common program is used as a program for converting PDL2-CM92 into BMP data and as a program for converting PDL3-CM92 into BMP data. More specifically, only the PDL2 program 60 includes a command which converts command CM92 into BMP data. In this embodiment, a common program is used as a program for converting commands having a common concept common to a plurality pf types of PDLs into "all PDL common intermediate language". Further, a common program used as a program which converts a command having a common concept common to PDL1 and PDL2 into "PDL1/2 common intermediate language" is provided.

The program memory area 118 stores an all PDL command list 80. The all PDL command list 80 stores commands of the PDLs to be converted into "all PDL common intermediate language". For example, PDL1-CM11 is converted into "all PDL common intermediate language" (AllPDL-CM10). Therefore, the All PDL command list 80 includes PDL1-CM11. Further, to the All PDL command list 80, commands of the PDL1/2 common intermediate language to be converted into "all PDL common intermediate language" are written. For example, since the command CM70 of PDL1/2 common intermediate language (PDL1/2-CM70) is converted into "all PDL common intermediate language" (All-PDL-CM70), the All PDL command list 80 includes PDL1/2-CM70.

The program memory area 18 stores a PDL1/2 command list 82. To the PDL1/2 command list 82, commands of PDLs (the first PDL and the second PDL) to be converted into the PDL1/2 common intermediate language are written. For example, since the PDL1-CM71 is converted into the PDL1/2 common intermediate language (PDL1/2-CM70), the PDL1/2 command list 82 includes the PDL1-CM71.

The program s\memory area 19 stores a PDL1/2 program 90. The PDL1/2 program 90 includes programs 92 and 94 each of which has a function of converting each command of the PDL1/2 common intermediate language into another type of data. The program 92 converts a command of PDL1/2 common intermediate language into "all PDL common intermediate language". In FIG. 13, as an example of the program 92, a program which converts a command CM70 of the PDL1/2 common intermediate language (PDL1/2-CM70) into "all PDL common intermediate language" is illustrated. The program 94 converts a command of the PDL1/2 common intermediate language into BMP data. In FIG. 13, as an example of the program 94, a program which converts a command CM80 of the PDL1/2 common intermediate language (PDL1/2-CM80) into BMP data is illustrated.

The program memory area 118 stores an All PDL program 100. The All PDL program 100 includes a program which converts each command of "all PDL common intermediate language" into BMP data. In FIG. 13, as an example of the program 100, a program which converts a command CM 10 of "all PDL common intermediate language" (AllPDL-CM10) into BMP data is illustrated.

Further, the program memory area 118 stores an alternative program 110 and another program 112. The alternative program 110 is used, when a certain command of PDL data can not be converted into BMP data, to convert a part of the command into BMP data. For example, in this embodiment, when a command describing special gradation can not be converted into BMP data completely reflecting the gradation designated in the command, BMP data describing only a shape (i.e., a contour) of the gradation is generated. The alternative program 110 has such a function.

FIGS. 14A, 14B, 14C and 14D illustrate examples of commands of PDLs. As shown in FIG. 14A, each of PDL1-CM11, PDL2-CM12 and PDL3-CM13 is a command for describing simple gradation using a simple color (hereafter, referred to as "simple color and simple gradation"). These commands are converted into the command CM10 (AllPDL-CM10) of the "all PDL common intermediate language" by the programs 52, 62 and 72 as shown in FIG. 13. Next, the AllPDL-CM10 is converted into BMP data by the program 100 as shown in FIG. 13. The program 100 is used as a common program common to PDL1-CM11, PDL2-CM12 and PDL3-CM13, for converting vector data into BMP data. Such a configuration makes it possible to decrease the data amount for programs.

As shown in FIG. 14B, PDL1-CM91 is a command for describing complicated gradation using a simple color (hereafter, referred to as a "simple color and complicated gradation"). The simple color and complicated gradation described by the PDL1-CM91 can not be described by another PDL, such as PDL2 or PDL 3. In this embodiment, the "simple color and complicated gradation" which can be described only by a small number of types of PDLs (which is described only by PDL1 in this embodiment) is converted into BMP data without being converted into an intermediate language. In this case, only a program for directly converting PDL1-CM91 into BMP data is required.

Considering a case where a way for converting PDL1-CM91 into an intermediate language is adopted, a program for converting PDL1-CM91 into "all PDL common intermediate language" and a program for converting the "all PDL common intermediate language" into BMP data are required. However, since a program for converting "all PDL common intermediate language" which is converted from PDL-CM91, into BMP data can not be used for processing another command, such as PDL2 or PDL3, the program can not be used as a common program. Therefore, in this case, the data amount for programs increases in comparison with the case where a program for converting directly PDL1-CM91 into BMP is used. By contrast, according to the embodiment, PDL1-

CM91 is converted directly into BMP data. Therefore, the data amount for programs can be decreased.

As shown in FIG. 14C, each of PDL1-CM71 and PDL2-CM72 is a command for describing simple gradation using a special color (hereafter, referred to as "special color and simple gradation"). These programs are converted into the command CM70 of the PDL1/2 common intermediate language (PDL1/2-CM70) by the programs 54 and 64 as shown in FIG. 13. Then, PDL1/2-CM70 is converted into the command CM70 of "all PDL common intermediate language" (AllPDL-CM70) by the program 92 as shown in FIG. 13. In this case, the special color is converted into a simple color. Next, the AllPDL-CM70 is converted into BMP data by the program 100 as shown in FIG. 13. Since a common program for converting a special color into a simple color (i.e., the program 92) can be used for PDL1-CM71 and PDL2-CM72, the data amount for the programs can be decreased.

As shown in FIG. 14D, each of PDL1-CM81 and PDL2-CM82 is a command describing complicated gradation using a special color (hereafter, referred to as "special color and complicated gradation"). These commands are converted into the command CM80 of the PDL1/2 common intermediate language (PDL1/2-CM80) by the programs 54 and 64 as shown in FIG. 13. The PDL1/2-CM80 is converted into BMP data without being converted into the intermediate language.

Figure 15:
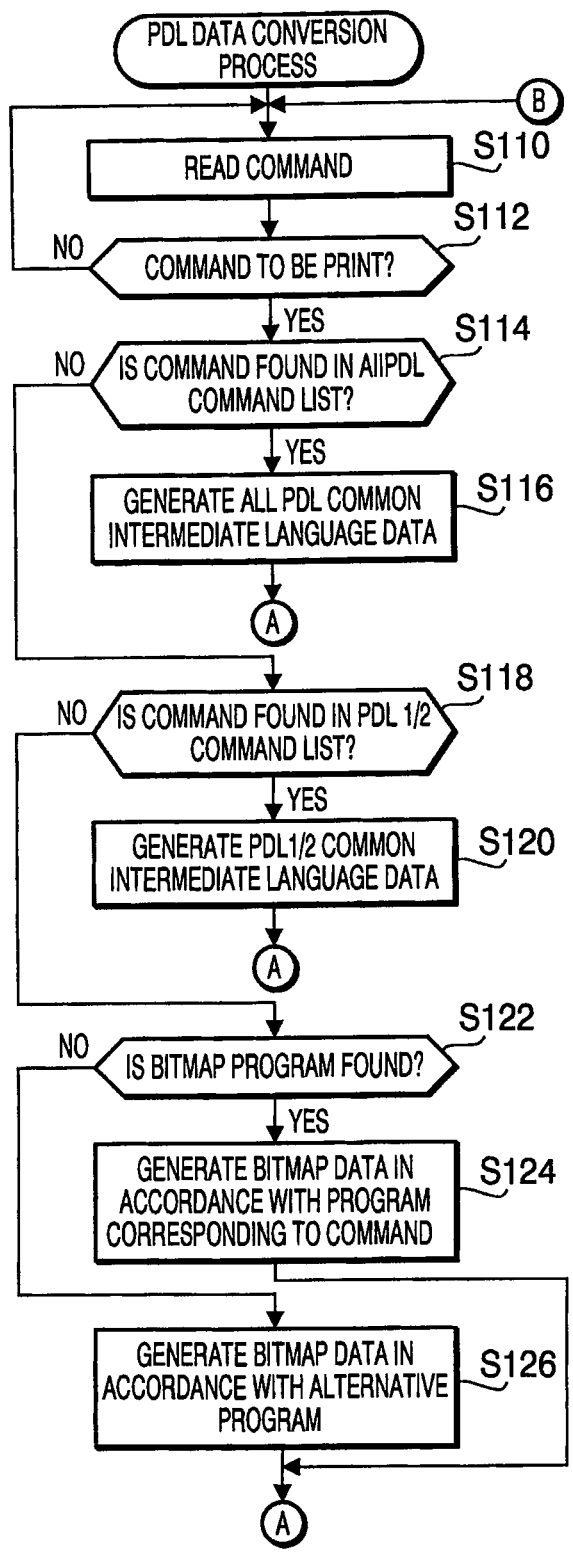
FIGS. 15 and 16 illustrate a flowchart of a PDL data conversion process.
Figure 16:
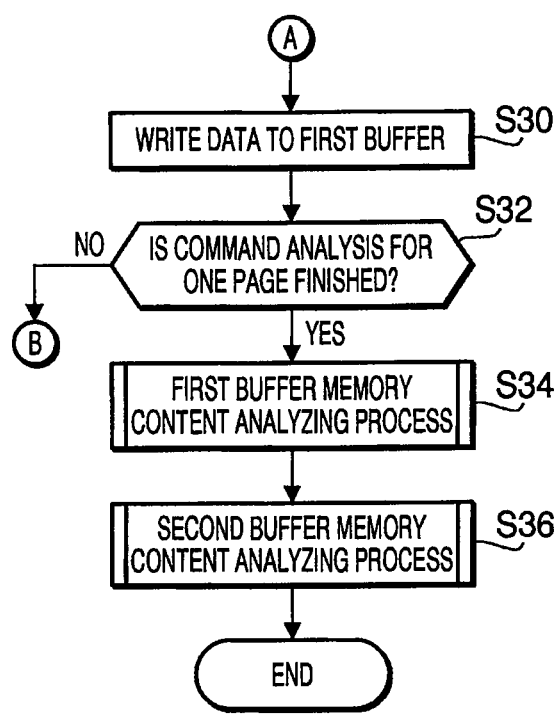

Hereafter, a PDL data conversion process to be executed under control of the controller 14 is explained. FIGS. 15 and 16 illustrate a flowchart of the PDL data conversion process. The PDL data conversion process is started when a print command and PDL data are inputted to the printer 10 via the network interface 12.

When the PDL data conversion process is started, the controller 14 reads a command contained at a top in the PDL data from the PC 140 (step S110). When step S110 is processed for the second time or later, a next command contained in the PDL is read. In step S112, the controller 14 judges whether the command is to be subjected to the print operation. Step S112 is repeated, until the controller 14 receives a command to be subjected to the print operation. Regarding a command for a bookmark which is not the command to be subjected to the print operation, the controller 14 makes a judgment of "NO" in step S112. In this case, control returns to step S110 to read a next command.

If the controller 114 judges that the command is to be subjected to the print operation (S112: YES), control proceeds to step S114 where the controller 14 judges whether the command read at step S110 is found in the All PDL command list 80 (see FIG. 13) (step S114). That is, the controller 114 judges whether the command read in step S110 is supported by the programs 52, 62 and 72 for converting the command into "all PDL common intermediate language". For example, if the command read in step S110 is the PDL1-CM11, the judgment result of step S114 is "YES". In this case, the controller 114 converts the command into the "all PDL common intermediate language" in accordance with the programs 52, 62 and 72 supporting the command read in step S110 (step S116). More specifically, the controller 114 converts vector data in the command read in step S110 into vector data of the "all PDL common intermediate language". In the case of the PDL1-CM11, the command is converted into AllPDL-CM10 (see the program 52 in FIG. 13 and FIG. 14A). After step S116 is processed, control proceeds to step S30 of FIG. 16.

If the judgment result of S114 is "NO", the controller 14 judges whether the command read in step S110 is contained in the PDL1/2 command list 82 (see FIG. 13) (step S118). That is, the controller 14 judges whether the command read in step S110 is supported by the programs 54 and 64 for converting the command into the PDL1/2 common intermediate language. For example, if the command read in step S110 is the PDL1-CM71, the judgment result of step S118 is "YES". In this case, the controller 114 converts the command into the PDL1/2 common intermediate language in accordance with the programs 54 and 64 which supports the command read in step S110 (step S120). In the case of the PDL1-CM71, the command is converted into PDL1/2 (see the program 54 in FIG. 2 and FIG. 14C). After step S120 is processed, control proceeds to step S30 in FIG. 16.

If the judgment result of step S118 is "NO", the controller 14 judges whether a program for converting the command read in step S110 into BMP data exists (step S122). For example, if the command read in step S110 is the PDL1-CM91, the judgment result of step S122 is "YES". In this case, the controller 114 converts the command into BMP data in accordance with the programs 56, 66 and 74 which support the command read in step S110. For example, as shown in FIG. 14B, the PDL1-CM91 is converted into BMP data without being converted into the intermediate language. After step S124 is processed, control proceeds to step S30 in FIG. 16.

If the judgment result of step S122 is "NO", the command read in step S110 is not supported by any of the programs 50, 60 and 70. That is, the command read in step S110 is a command for which BMP data described in the command can not be generated. In this case, the controller 114 converts only a part of the command read in step S110 into BMP data in accordance with the alternative program 100 (step S126). For example, if the command read in step S110 contains coordinate data representing a contour and designation of filling the contour in complicated gradation, the controller 14 replaces the complicated gradation with a simple color, and generates BMP data reflecting accurately the coordinate data. After step S126 is processed, control proceeds to step S30 in FIG. 16.

In step S30 of FIG. 16, the controller 14 writes the data generated in steps S116, S120, S124 and S126 (i.e., "all PDL common intermediate language", PDL1/2 common intermediate language, and BMP data) to a first buffer 20. As described in detail later, regarding BMP data, the BMP data itself is written to the page memory 24 in a later process (i.e., in step S74 of FIG. 18). When the BMP data is written to the first buffer 20, data representing a position of the BMP data on the page memory 24 is added to the BMP data. By referring to such data (position), it is possible to write the BMP data into the page memory 24. It should be noted that the BMP data may be written to the page memory 24 in step S30.

Next, the controller 114 judges whether the commands for a page of PDL data have been analyzed (step S32). If the commands for a page of PDL data have not been processed (S32: NO), control returns to step S110 to read a next command. On the other hand, if all the commands for a page of PDL data have been processed (S32: YES), each of the commands of a page has been converted into another type of data, and the converted data has been stored in the first buffer 20. In this case, the controller 114 executes a first buffer memory content analyzing process (step S34) and a second buffer memory content analyzing process (S36) sequentially. The controller 14 executes the PDL data conversion process on the basis of a unit of a page of PDL data. Therefore, if the PDL data has a second or subsequent page, the controller executes the PDL data conversion process for the second or subsequent page after processing the first page of the PDL data. It should be noted that the controller 114 may execute concurrently PDL data conversion processes for a plurality of pages of PDL data.

Figure 17:
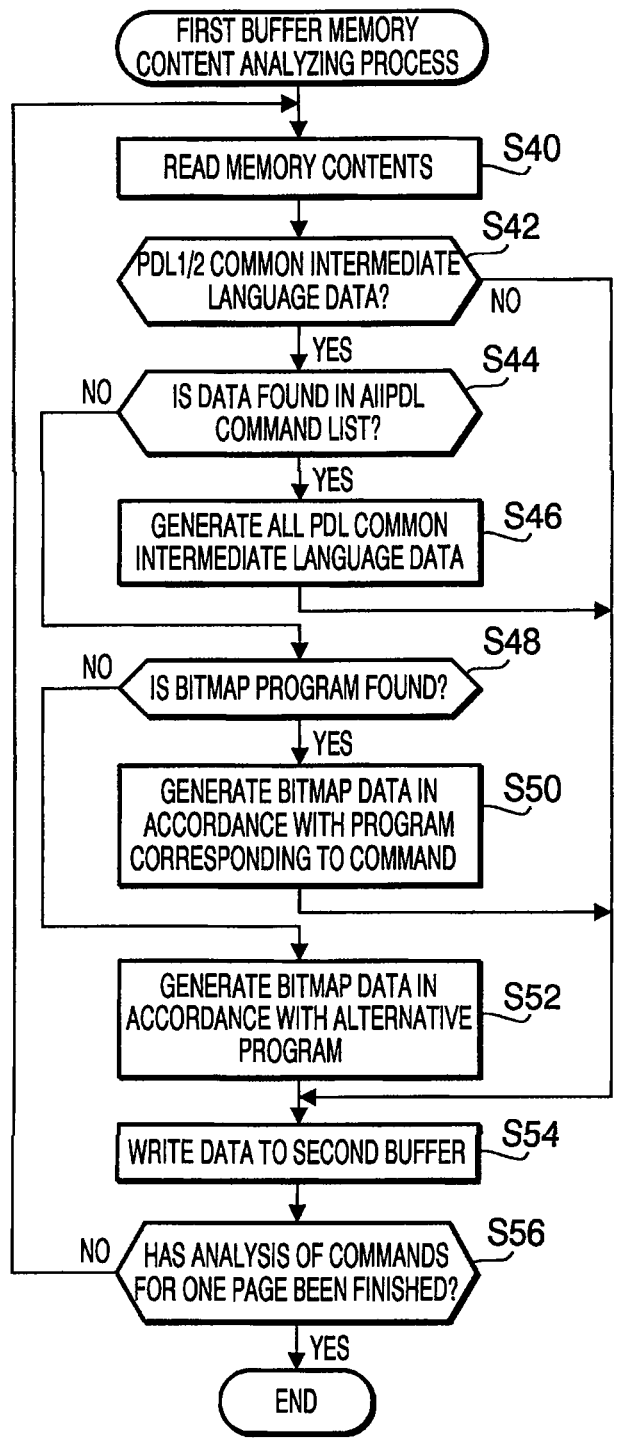
FIG. 17 is a flowchart illustrating a first buffer memory content analyzing process executed in step S34 in FIG. 16.

FIG. 17 is a flowchart illustrating the first buffer memory content analyzing process executed in step S34 of FIG. 16.

First, the controller 14 reads data at a top of the first buffer (step S40). After step S40 is process for the second time or later, the controller 114 reads data at a next or subsequent position in the first buffer 20. The controller 114 judges whether the data read in step S40 is a command described in the PDL1/2 common intermediate language (step S42). The fact that the data read in step S40 is not a command described in the PDL1/2 common intermediate language (S42: NO) means the data read in step S40 is the "all PDL common intermediate language" or BMP data. In this case, the controller 114 writes the data read in step S40 itself into the second buffer 22 (step S54).

On the other hand, if the judgment result of step S42 is "YES", the controller 114 judges whether the command read in step S40 (PDL1/2 common intermediate language) is found in the ALL PDL command list 80 (see FIG. 13) (step S44). That is, the controller 114 judges whether the command read in step S40 is supported by the program 92 for converting the command into "all PDL common intermediate language". Fir example, if the command read in step S40 is the PDL1/2-CM70, the judgment result of step S44 becomes "YES". In this case, the controller 114 converts the command into the "all PDL common intermediate language" in accordance with the program 93 which supports the command read in step S40 (step S46). In the case of the command of the PDL1/2-CM70, the command is converted into the AllPDL-CM70 (see the program 92 in FIG. 2 and FIG. 3C). Through such processes, the special color is converted to a simple color. Next, the controller 114 writes the data ("all PDL common intermediate language") generated in step S46 to the second buffer 22 (step S54).

If the command read in step S46 is the PDL1/2-CM80, the judgment result of step S44 is "NO". In this case, the controller 114 judges whether a program for generating the BMP data from the command read in step S40 exists (step S48). For example, if the command read in step S40 is the PDL1/2-CM80, the judgment result of step S48 is "YES". In this case, the controller 114 converts the command into BMP data in accordance with the program 94 which supports the command read in step S40 (step S50). In the case of the PDL1/2-CM80, the command is converted into BMP data (see the program 94 in FIG. 13, and FIG. 14D). Next, the controller 114 writes the BMP data generated in step S50 to the second buffer (step S54).

If the judgment result of step S48 is "NO", the controller 114 converts a part of the command read in step S40 (the PDL1/2 common intermediate language) into BMP data (step S52). This step is the same as the step in S126. Next, the controller 114 writes the BMP data generated in step S52 to the second buffer 22 (step S54).

After step S54 is processed, the controller 114 judges whether all the commands in a page of PDL data stored in the first buffer 20 have been processed (step S56). If the judgment result of step S56 is "NO", control returns to step S40 to process a next command. If the judgment result of step S56 is "YES", the first buffer memory content analyzing process terminates. Then, the second buffer memory content analyzing process is executed (step S36 of FIG. 5).

Figure 18:
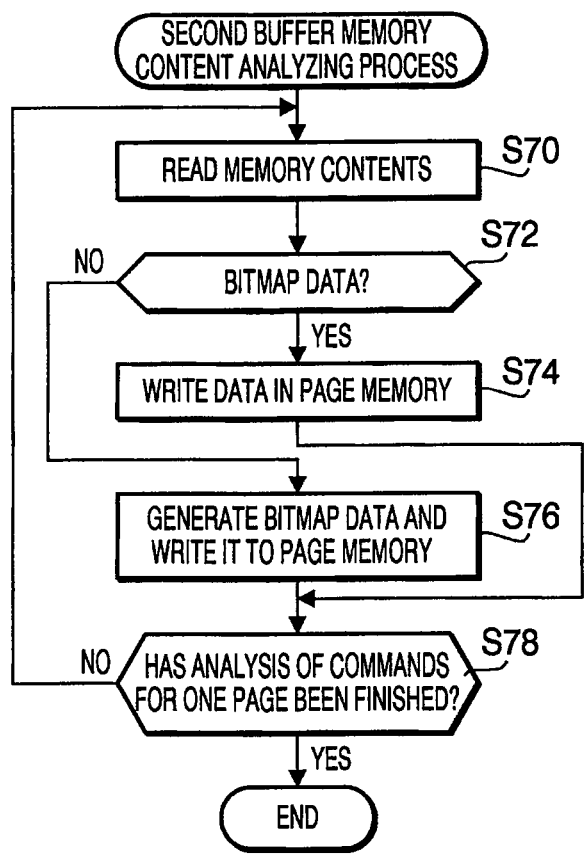
FIG. 18 is a flowchart of a second buffer memory content analyzing process executed in step S36 in FIG. 16.

FIG. 18 is a flowchart of the second buffer memory content analyzing process executed in step S36 in FIG. 16. First, the controller 14 reads data at a top of the second buffer 22 (step S70). Regarding the second time or subsequent time execution of the step S70, the controller 114 reads data at a next or subsequent position in the second buffer 22. Next, the controller 114 judges whether the data obtained in step S70 is BMP data (step S72). If the data obtained in step S70 is BMP data (S72: YES), the controller 14 writes the BMP data itself into the page memory 24 (step S74).

On the other hand, if the data obtained in step S70 is a command of the "all PDL common intermediate language", the judgment result of step S72 is "YES". In this case, the controller 114 converts the command into the BMP data in accordance with the program 100 which supports the "all PDL common intermediate language" obtained in step S70 (step S76). For example, each of AllPDL-CM10 and AllPDL-CM70 is converted into the BMP data (see the program 100 of FIG. 13 and FIGS. 14A and 14C). The controller 114 writes the BMP data to the page memory 124.

After step S74 or S76 is processed, the controller 114 judges whether all the commands for a page stored in the second buffer 22 have been analyzed (step S78). If all the commands for a page have not been processed (S78: NO), control returns to step S70 to read a next command. If all the commands of a page have been processed (S78: YES), the second buffer memory content analyzing process terminates. As a result, the page memory 124 for one page can be completed. Then, the controller 114 instructs the print unit 128 to print an image corresponding to contents (i.e., BMP data) in the page memory 124. Then, the print unit 128 starts to carry a print medium and to print an image in the print medium.

As described above, according to the embodiment, the vector data corresponding to "simple color simple gradation" in a unique format of each of the PDL1, PDL2 and PDL3 is converted into "all PDL common intermediate language". Then, the BMP data is generated from the vector data described in "all PDL common intermediate language". Therefore, regarding processing of the PDL1-PDL3, it is possible to provide a common program for generating the BMP data from the vector data described in "all PDL common intermediate language". Such a configuration makes it possible to decrease the data amount for programs.

Further, regarding the vector data for "simple color and complicated gradation" (see FIG. 14B), the vector data is converted to BMP data without being converted to the intermediate language. Since the program for converting the vector data of the simple color and complicated gradation into "all PDL common intermediate language" is not required, it is possible to decrease the data amount for a required program.

In this embodiment, the alternative program 110 is used, it is possible to generate the BMP data from a part of the command even if BMP data described by the command can not be generated. In this embodiment, when the same command is used for a plurality of types of PDLs (e.g., CM92 for PDL2 and PDL3), a common program for generating another type of data from the command is used As described above, according to the second embodiment, vector data of "simple color and simple gradation" described in a unique format of each of PDL1, PDL2 and PDL3 (see FIG. 14A) is converted into "all PDL common intermediate language". Then, BMP data is generated from vector data described in "all PDL common intermediate language". Regarding processing of PDL1, PDL2 and PDL3, a common program (program 100) for generating BMP data from "all PDL common intermediate language" can be used for PDL1, PDL2 and PDL3. Such a configuration makes it possible to decrease the data amount for necessary programs. In addition, regarding vector data for "simple color and complicated gradation" (see FIG. 14B), the vector data is converted into BMP data without being converted into intermediate language. Since a program for converting vector data of "simple color and complicated gradation" into "all PDL common intermediate language" is not required, the data amount for necessary programs can be decreased.

In the second embodiment, the alternative program 110 is used. Therefore, even if BMP data represented by a command can not be generated, BMP data can be generated from a part of the command. In the second embodiment, for a common command common to a plurality of types of PDLs (e.g., CM92 common to PDL2 and PDL3), a common program is used for generating another type of data (e.g., "all PDL common intermediate language", "PDL1/2 common intermediate language" or BMP data) from such a common command. Such a configuration makes it possible to decrease the data amount foe necessary programs.

In the second embodiment, a technique where PDL data is converted into "PDL1/2 common intermediate language" and then "PDL1/2 common intermediate language" is converted into "all PDL common intermediate language" is adopted. Such a configuration makes it possible to use a common program for converting, for example, a special color into a typical color (see FIG. 14C). Such a configuration also makes it possible to decrease the data amount for necessary programs.

Although the present invention has been described in considerable detail with reference to certain preferred embodiments thereof, other embodiments are possible.

Hereafter, variations of the second embodiment are described.

In the above described second embodiment, the command is converted into BMP data at step S124 or S126 in the PDL data conversion process shown in FIG. 15. However, the command may be converted into BMP data at step S72 in the second buffer memory content analyzing process shown in FIG. 18. For example, if the command read in step S110 in FIG. 15 is PDL1-CM91, the controller 14 may operate to write PDL1-CM91 to the first buffer 20 at step S124 in FIG. 15, to write also PDL1-CM91 to the second buffer at step S54 in FIG. 17, and then to convert PDL1-CM91 into BMP data at step S72 in FIG. 18. Such a configuration makes it possible to decrease the necessary memory size because there is no necessity to store BMP data having a relatively large data size into each of the buffers 20 and 22. Such a configuration can be generally expressed as follows.

What is claimed is:

1. A page description language processing device, comprising:
a processor; and
memory operatively coupled to the processor and storing computer readable instructions that, when executed, cause the page description language processing device to function as:
a data input unit configured to receive input data described in a page description language, the received data including a plurality of commands;
a program storage unit configured to store:
a first program having a function of converting a command described in a predetermined format into a common intermediate command described in an intermediate language and common to a plurality of types of page description languages, for each of the plurality of types of page description languages, and
a second program having a function of converting a command described in the predetermined format into an intermediate command common to at least two, but least that all of, the plurality of types of page description languages;
a first judgment unit configured to judge whether a command read from the data received through the data input unit corresponds to one of the first program and the second program stored in the program storage unit for each of the plurality of commands in the received data;
a second judgment unit configured to determine which one of the first program or the second program to use in response to the first judgment unit judging that the command read from the data received through the data input unit corresponds to one of the first program and the second program stored in the program storage unit;
a common intermediate command creation unit configured to generate the common intermediate command from the command read from the data received through the data input unit in accordance with the one of the first program and the second program determined by the second judgment unit in response to the first judgment unit judging that the command read from the data received through the data input unit corresponds to one of the first program and the second program stored in program storage unit;
a first bitmap data creation unit configured to generate first bitmap data from the common intermediate command generated by the common intermediate command creation unit; and
a second bitmap data creation unit configured to generate second bitmap data directly from the command read from the data received through the data input unit without being converted into the common intermediate command in response to the first judgment unit judging that the command read from the data received through the data input unit does not correspond to one of the first program and the second program stored in the program storage unit.

2. The page description language processing device according to claim 1, wherein the memory further comprises computer readable instructions that, when executed, cause the page description language processing device to function as:
a first bitmap data creation program storage unit configured to store a first bitmap generating program having a function of generating the first bitmap data from the common intermediate command; and
a second bitmap data creation program storage unit configured to store a second bitmap generating program having a function of generating the second bitmap data directly from the command read from the received data, for each of the plurality of types of page description languages,
wherein:
the first bitmap data creation unit is configured to generate the first bitmap data from the common intermediate command in accordance with the first bitmap generating program stored in the first bitmap data creation program storage unit; and
the second bitmap data creation unit is configured to generate the second bitmap data from the command read from the received data in accordance with the second bitmap generating program stored in the second bitmap data creation program storage unit.

3. The page description language processing device according to claim 2, wherein the memory further comprises computer readable instructions that, when executed, cause the page description language processing device to function as:
a third judgment unit configured to judge whether the command read from the received data corresponds to the second bitmap generating program stored in the second bitmap data creation program storage unit, wherein the second bitmap data creation unit is configured to:
  generate the second bitmap data from the entire data received through the data input unit described in accordance with the second bitmap generating program stored in the second bitmap data creation program storage unit in response to the first judgment unit judging that the command read from the data received through the data input unit does not correspond to one of the first program and the second program stored in the storage unit and the third judgment unit judging that the command read from the received data corresponds to the second bitmap generating program stored in the second bitmap data creation program storage unit; and
  generate the second bitmap data from a part of the data received through the data input unit in response to the first judgment unit judging that the command read from the data received through the data input unit does not correspond to one of the first program and the second program stored in the program storage unit and the third judgment unit judging that the command read from the received data does not correspond to the second bitmap generating program stored in the second bitmap data creation program storage unit.

4. The page description language processing device according to claim 2, wherein the second bitmap data creation program storage unit is configured too store a common program having a function of generating bitmap data from data described in a common format common to at least two types of page description languages.

5. The page description language processing device according to claim 1, wherein:
  the second program has a function of generating data described in a second intermediate language different from the intermediate language, from the command read from the received data; and
  the program storage unit is further configured to store a third program having a function of generating the common intermediate command from the data described in the second intermediate language,
  wherein the common intermediate command creation unit is configured to:
    generate the data described in the second intermediate language from the data received through the data input unit in accordance with the second program in response to determining that the command read from the received data corresponds to the second program; and
    generate the common intermediate command in accordance with the third program.

6. The page description language processing device, Kageyama in view of Yamada teaches the limitations contained in parent claim 2, Kageyama further teaches:
  wherein:
    the program storage unit is configured to store a fourth program configured to create data described in the intermediate language from the data described in a second predetermined format of the page description language, for each of the at least two types of page description languages; and
    the common intermediate command creation unit is configured to generate the data described in the intermediate language from the data received through the data input unit in accordance with the fourth program in response to determining that the description format describing the data received through the data input unit corresponds to the fourth program.

7. A method comprising the steps of:
  receiving, by a page description language processing device, input data described in a page description language, the received data including a plurality of commands;
  storing a first program and a second program, the first program having a function of converting a command described in a predetermined format into a common intermediate command described in an intermediate language and common to a plurality of types of page description languages, for each of the plurality of types of page description languages, wherein the second program has a function of converting a command described in the predetermined format into an intermediate command common to at least two, but least that all of, the plurality of types of page description languages;
  judging, by the page description language processing device, whether a command read from the received data corresponds to one of the first program and the second program stored in the program storage unit;
  in response to judging that the command read from the received data corresponds to one of the first program and the second program stored in the program storage unit; determining which one of the first program or the second program to use;
  generating the common intermediate command from the data received through the data input unit in accordance with the one of the first program and the second program determined for use; and
  generating second bitmap data directly from the data received through the data input unit without being converted into the common intermediate command in response to judging that the command read from the data received through the data input unit does not correspond to one of the first program and the second program stored in the program storage unit.

8. A non-transitory computer readable medium having computer readable instructions stored thereon, which, when executed by a processor of a page description language processing device, causes the page description language processing device to perform the steps of:
  receiving input data described in a page description language, the received data including a plurality of commands;
  storing a first program and a second program, the first program having a function of converting a command described in a predetermined format into a common intermediate command described in an intermediate language and common to a plurality of types of page description languages, for each of the plurality of types of page description languages, wherein the second program has a function of converting a command described in the predetermined format into an intermediate command common to at least two, but least that all of, the plurality of types of page description languages;
  judging whether a command read from the received data correspond to one of the first program and the second program stored in a program storage unit;
  in response to judging that the command read from the received data corresponds to one of the first program and the second program stored in the program storage unit; determining which one of the first program or the second program to use;

generating the common intermediate command from the data received through the data input unit in accordance with the one of the first program and the second program determined for use; and generating second bitmap data directly from the data received through the data input unit without being converted into the common intermediate command in response to judging that the command read from the data received through the data input unit does not correspond to one of the first program and the second program stored in the program storage unit.

* * * * *